United States Patent [19]

Szabo

[11] 3,740,535

[45] June 19, 1973

[54] NUMERICAL CONTOURING CONTROL SYSTEM

[75] Inventor: Andras I. Szabo, Export, Pa.

[73] Assignee: Westinghouse Electric Corporation, Pittsburgh, Pa.

[22] Filed: Aug. 16, 1971

[21] Appl. No.: 172,074

[52] U.S. Cl. .......... 235/151.11, 235/152, 318/570, 318/573
[51] Int. Cl. ............................................ G06f 15/46
[58] Field of Search................. 235/151.11, 150.31, 235/152; 318/569-570, 573-574, 600-601

[56] References Cited
UNITED STATES PATENTS

| | | | |
|---|---|---|---|
| 3,254,203 | 5/1966 | Kveim | 235/151.11 X |
| 3,525,917 | 8/1970 | Leenhouts | 318/570 |
| 3,585,478 | 6/1971 | Leenhouts | 318/573 |
| 3,506,812 | 4/1970 | Rosener | 235/151.11 X |

Primary Examiner—Malcolm A. Morrison
Assistant Examiner—Jerry Smith
Attorney—F. H. Henson, R. G. Brodahl and J. J. Wood

[57] ABSTRACT

This disclosure relates to a numerical contouring control system for controlling the displacements of a machine tool along two or more axes in response to intelligence indicia on a control media such as a tape. The time required to complete one block of information is arranged in digital form as an arithmetical numerator. The displacements in rectangular coordinate directions are respectively arranged in digital form as arithmetical denominators. Successively, each denominator is subtracted from the numerator. When a change in sign in the remainder is detected, a position signal is sent to command an incremental displacement ΔL along a rectangular coordinate direction. Upon detecting a change in sign in the remainder, the digital information in the numerator is added to the remainder at the advent of the next subtraction. The subtraction process is iterative and continues until the position demand is equated to the end displacement indicator by the intelligence on the control media. A cooperating sero system continues to actuate associated drive mechanisms until the position demand and the actual position produce zero error signal.

When the rectangular coordinates are part of a circular quadrant, the denominator for each coordinate is appropriately adjusted as subtraction proceeds, the denominator for one of said coordinates being incrementally increased, while the denominator for the other coordinate is decrementally decreased.

6 Claims, 19 Drawing Figures

Patented June 19, 1973
3,740,535
7 Sheets-Sheet 3
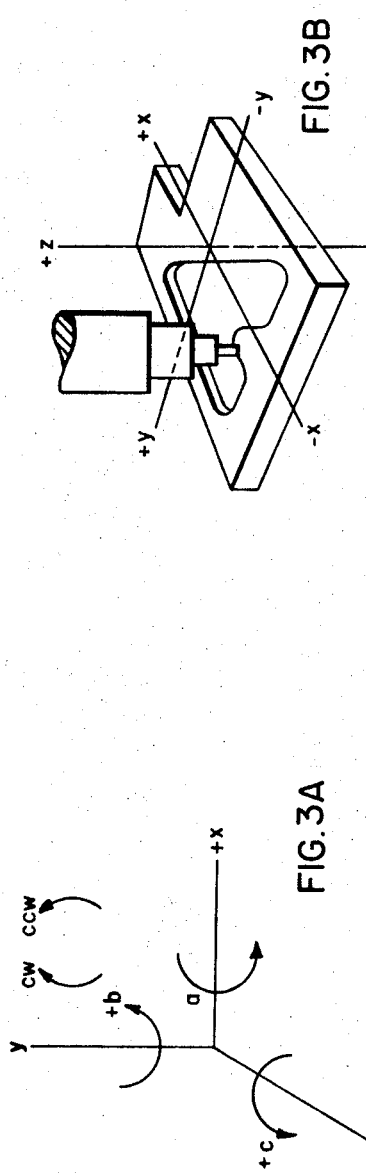
FIG. 3A
FIG. 3B
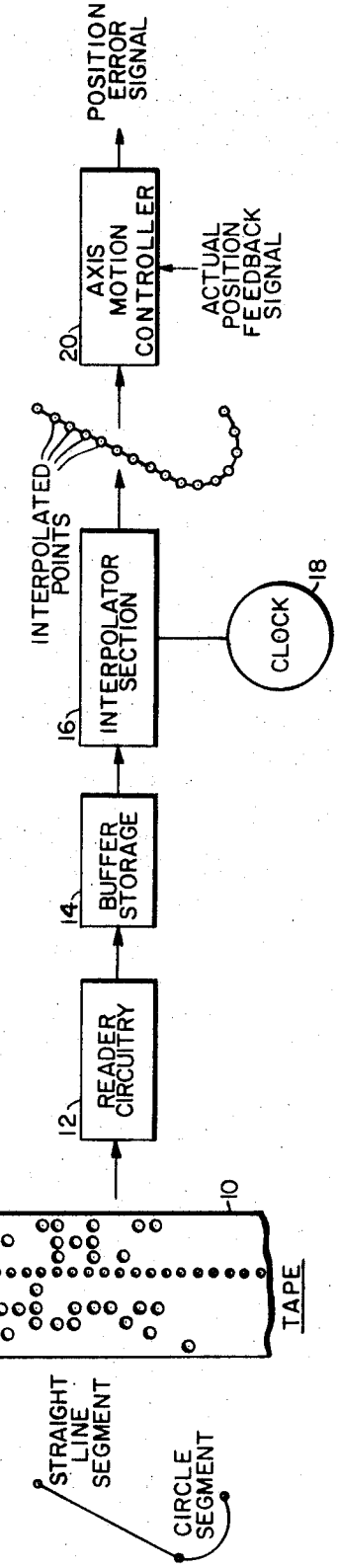
FIG. 4

LINEAR INTERPOLATION

CIRCULAR INTERPOLATION

LINEAR INTERPOLATION
TLin = TIME FROM START TO FINISH

CIRCULAR INTERPOLATION
Trad = TIME FROM START TO FINISH

| CONTOURING MODE | SIGN OF | | INITIAL MAGNITUDE IN DENOMINATOR REGISTER | | INTERPOLATOR DRIVING COUNTERS 53 & 59 | |
|---|---|---|---|---|---|---|
| | x | y | 36 | 48 | | |
| LINEAR | + | + | x | y | 53 UP | 59 UP |
| LINEAR | + | – | x | –y | 53 UP | 59 DOWN |
| LINEAR | – | + | –x | y | 53 DOWN | 59 UP |
| LINEAR | – | – | –x | –y | 53 DOWN | 59 DOWN |
| CIRCULAR CW | + | + | i | j | 59 UP | 53 UP |
| CIRCULAR CW | + | – | j | i | 53 UP | 59 DOWN |
| CIRCULAR CW | – | + | j | i | 53 DOWN | 59 UP |
| CIRCULAR CW | – | – | i | j | 59 DOWN | 53 DOWN |
| CIRCULAR CCW | + | + | j | i | 53 UP | 59 UP |
| CIRCULAR CCW | + | – | i | j | 59 UP | 53 DOWN |
| CIRCULAR CCW | – | + | i | j | 59 DOWN | 53 UP |
| CIRCULAR CCW | – | – | j | i | 53 DOWN | 59 DOWN |

DURING LINEAR CONTOURING THE DENOMINATOR REGISTERS REMAIN CONSTANT
DURING CIRCULAR CONTOURING DENOMINATOR REGISTER 36 IS DECREASED BY ONE EACH TIME DOWN-COUNTER 54 REACHES ZERO, WHILE DENOMINATOR REGISTER 48 IS INCREASED BY ONE EACH TIME DOWN-COUNTER 42 REACHES ZERO.

FIG. 6

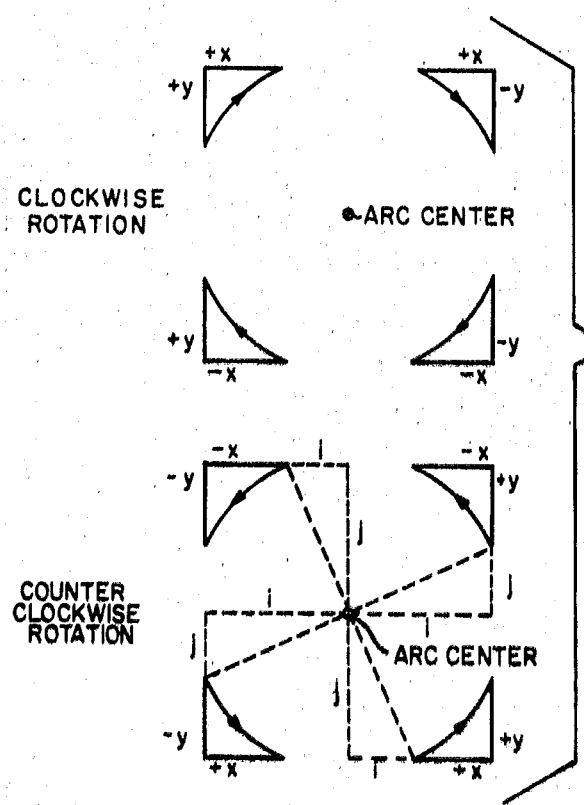

FIG. 7

$$\Delta T_{xL} \quad \frac{N}{D} = \frac{111}{33} = \frac{T_{Lin}}{|X_1|}$$

| CYCLE COUNT | REMAINDER | | SIGN BIT | POSITION DEMAND |
|---|---|---|---|---|
| 0 | $R_0 = 0$ | 0 | 0 | $X_0$ |
| 1 | $R_1 = R_0 - D + N$ | 78 | 0 | $X_0$ |
| 2 | $R_2 = R_1 - D$ | 45 | 0 | $X_0$ |
| 3 | $R_3 = R_2 - D$ | 12 | 0 | $X_0$ |
| 4 | $R_4 = R_3 - D$ | -21 | 1 | $X_0 + 1$ |
| 5 | $R_5 = R_4 - D + N$ | 57 | 0 | $X_0 + 1$ |
| 6 | $R_6 = R_5 - D$ | 24 | 0 | $X_0 + 1$ |
| 7 | $R_7 = R_6 - D$ | -9 | 1 | $X_0 + 2$ |
| 8 | $R_8 = R_7 - D + N$ | 69 | 0 | $X_0 + 2$ |
| 9 | $R_9 = R_8 - D$ | 36 | 0 | $X_0 + 2$ |
| 10 | $R_{10} = R_9 - D$ | 3 | 0 | $X_0 + 2$ |
| 11 | $R_{11} = R_{10} - D$ | -30 | 1 | $X_0 + 3$ |
| 12 | $R_{12} = R_{11} - D + N$ | 48 | 0 | $X_0 + 3$ |
| 13 | $R_{13} = R_{12} - D$ | 15 | 0 | $X_0 + 3$ |
| 14 | $R_{14} = R_{13} - D$ | -18 | 1 | $X_0 + 4$ |
| 15 | $R_{15} = R_{14} - D + N$ | 60 | 0 | $X_0 + 4$ |
| 16 | $R_{16} = R_{15} - D$ | 27 | 0 | $X_0 + 4$ |
| 17 | $R_{17} = R_{16} - D$ | -6 | 1 | $X_0 + 5$ |
| 18 | $R_{18} = R_{17} - D + N$ | 72 | 0 | $X_0 + 5$ |
| 19 | $R_{19} = R_{18} - D$ | 39 | 0 | $X_0 + 5$ |
| 20 | $R_{20} = R_{19} - D$ | 6 | 0 | $X_0 + 5$ |
| 21 | $R_{21} = R_{20} - D$ | -27 | 1 | $X_0 + 6$ |

FIG. 8

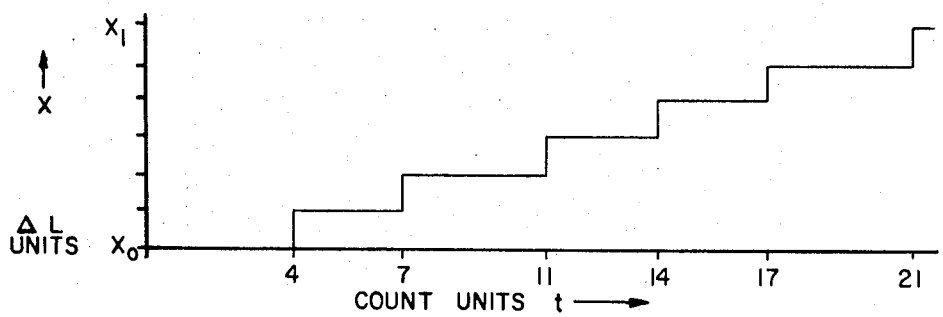

| FULL ADDER | | | | |
|---|---|---|---|---|
| INPUT | | | OUTPUT | |
| A | B | $C_i$ | S | $C_o$ |
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

A&B ARE INPUTS
$C_i$ = INTERNAL CARRY
S = SUM
$C_o$ = OUTPUT CARRY

FIG. 11

| DECIMAL | BINARY | | | |
|---|---|---|---|---|
| +5 | 0 | 1 | 0 | 1 |
| +4 | 0 | 1 | 0 | 0 |
| +3 | 0 | 0 | 1 | 1 |
| +2 | 0 | 0 | 1 | 0 |
| +1 | 0 | 0 | 0 | 1 |
| 0 | 0 | 0 | 0 | 0 |
| -1 | 1 | 1 | 1 | 1 |
| -2 | 1 | 1 | 1 | 0 |
| -3 | 1 | 1 | 0 | 1 |

FIG. 12

| FULL ADDER 82 | | | | |
|---|---|---|---|---|
| INPUT | | | OUTPUT | |
| A | B | $C_i$ | S | $C_o$ |
| 1 | 1 | 0 | 0 | 1 |
| 0 | 0 | 1 | 1 | 0 |
| 1 | 1 | 0 | 0 | 1 |
| 0 | 1 | 1 | 0 | 1 |

FIG. 13

| FULL ADDER 84 | | | | |
|---|---|---|---|---|
| INPUT | | | OUTPUT | |
| A | B | $C_i$ | S | $C_o$ |
| 0 | 0 | 0 | 0 | 0 |
| 0 | 1 | 0 | 1 | 0 |
| 0 | 0 | 0 | 0 | 0 |
| 0 | 0 | 0 | 0 | 0 |
| 0010 = +2 | | | | |

FIG. 14

| FULL ADDER 82 | | | | |
|---|---|---|---|---|
| INPUT | | | OUTPUT | |
| A | B | $C_i$ | S | $C_o$ |
| 0 | 1 | 0 | 1 | 0 |
| 0 | 0 | 0 | 0 | 0 |
| 0 | 1 | 0 | 1 | 0 |
| 0 | 1 | 0 | 1 | 0 |

FIG. 15

| FULL ADDER 84 | | | | |
|---|---|---|---|---|
| INPUT | | | OUTPUT | |
| A | B | $C_i$ | S | $C_o$ |
| 0 | 1 | 0 | 1 | 0 |
| 1 | 0 | 0 | 1 | 0 |
| 0 | 1 | 0 | 1 | 0 |
| 0 | 1 | 0 | 1 | 0 |
| 1111 = -1 | | | | |

NUMERICAL CONTOURING CONTROL SYSTEM

BACKGROUND OF THE INVENTION

1. Field of the Invention

This invention relates to a numerical contouring control system for controlling the displacements of a machine tool along two or more axes.

2. Discussion of the Prior Art

The closest prior art is a digital differential analyzer (DDA) of a type which is described at pages 303–305 in "Arithmetic Operations in Digital Computers" by R. K. Richards published by D. Van Nostrand Co. Inc. in 1955. In the DDA, the frequency with which the timing remainder register overflows is inversely proportional to the time required to complete a block of intelligence on the control media or tape. This is quite inconvenient in preparing the tape, so that it usually becomes necessary to utilize several g codes i.e., $g01$, $g10$, $g11$, each requiring a different feedrate number formula (Note: these codes are in accordance with standards adopted by the Electronic Industries Association of Washington, D.C. for the numerical control of machine tools). The system of the invention to be described is capable of handling all intelligence by means of a single algorithm.

The DDA requires the use of a feedrate number which is proportional to the reciprocal of the time required to complete one block of information. The present invention uses time directly which is a decided advantage.

A concomitant advantage of using time directly results in a superior surface finish for the system of the present invention over the interpolative process of the DDA. For example, in fast finishing where the speed may be one-tenth the speed of that of a roughing cut, the DDA in most cases has an interval between output pulses that is 10 time increments, occasionally occurring with a 20 time increment. In contrast the instant system under the same environmental conditions, will provide an interval between most pulses of 10 time increments with 11 time increments occurring at regular intervals. Obviously then, there is less jerking of the drive motor so that the cutting tool is advanced more evenly to produce a smoother finish.

SUMMARY OF THE INVENTION

Broadly the invention relates to a numerical contouring control system for controlling the motions of a machine tool along two or more axes in response to intelligence indicia derived from a prepared control media. The displacements along rectangular coordinate axis are respectively digitally subtracted from the time required to complete the cut depicted on one block of intelligence. A change in sign in the remainder results in a position signal to command an incremental displacement ΔL along the axes. The numerator is then added to the remainder, and successive subtractions continue until the position demand is equated to the end displacement indicated by the intelligence on the control media.

When circular contouring is taking place, the denominators are incrementally or decrementally adjusted respectively to reflect the changing magnitudes along a circular path.

BRIEF DESCRIPTION OF THE DRAWINGS

FIG. 3A is a diagram showing the axis nomenclature in accordance with standards adopted by the Electronic Industries Association;

FIG. 3B is a diagram showing the standard axis nomenclature applied to a milling machine tool;

FIG. 4 is a block diagram showing a numerical control system;

FIG. 6 is a diagram used in explaining the linear and circular contouring in accordance wit the invention;

FIG. 7 is another diagram used in explaining circular contouring in accordance with the invention;

FIG. 8 is a table showing the results of successive subtraction in accordance with the system of the invention;

FIG. 9 is a displacement vs count diagram;

FIG. 10 is a truth table for a full adder;

FIG. 11 is a table showing numbers in decimal and binary form and in particular illustrating the 2's complement for representing negative numbers;

FIGS. 12–15 are full adder tables used in explaining the operation of the invention.

ENVIRONMENTAL BACKGROUND

Figure 1:
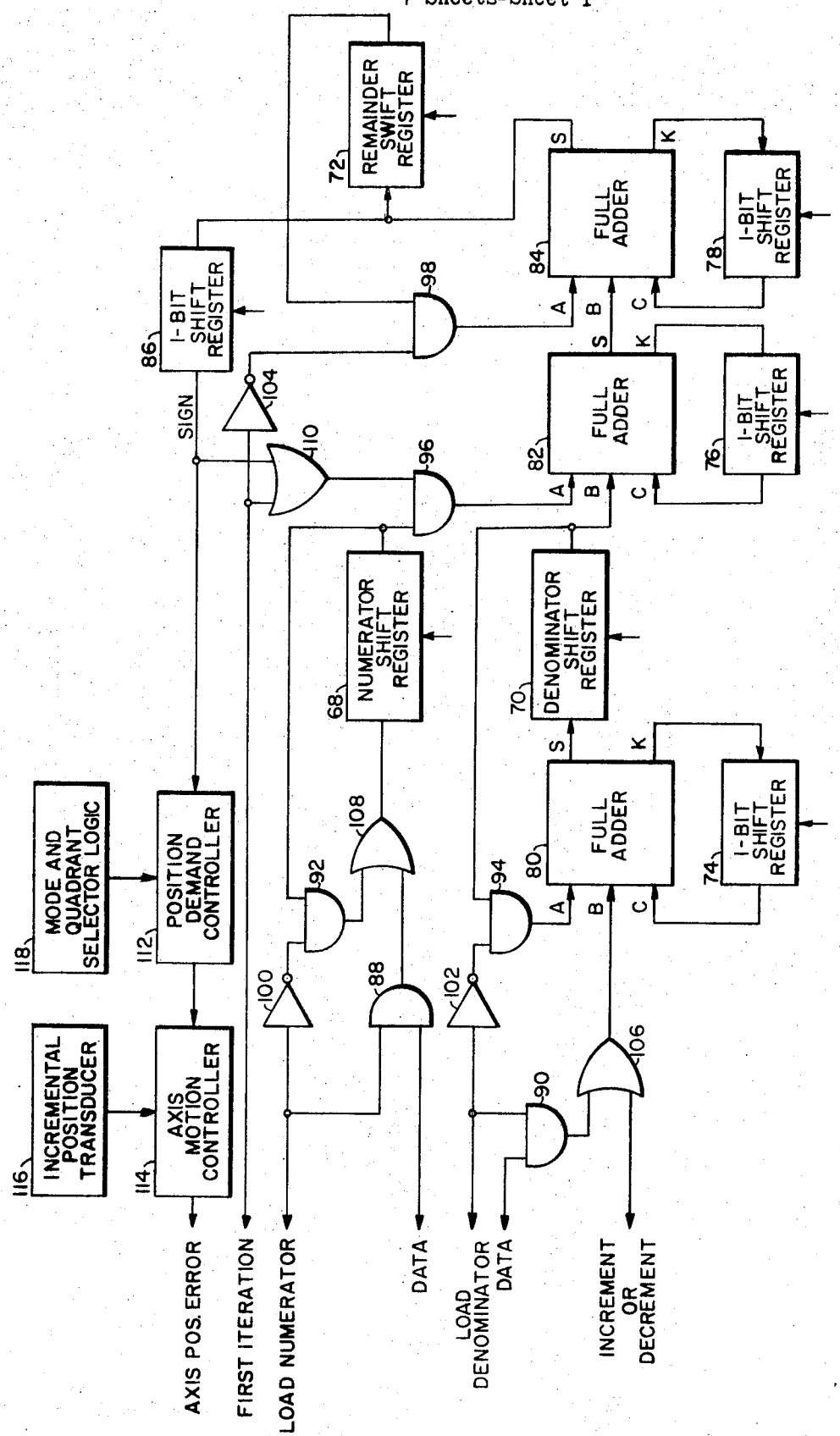
FIG. 1 is a block diagram of one exemplary embodiment of the numerical contouring control system in accordance with the invention.

Before beginning a discussion of the invention, it will be helpful to briefly background the environmental setting of the numerical control of machine tools. In FIG. 3A there is depicted axes and motion nomenclature for numerical controlled machines in accordance with standards adopted by the Electronic Industries Association of Washington, D.C. Additionally, for the purpose of discussing this invention, counterclockwise (CCW) and clockwise (CW) rotation in the x–y plane are defined as depicted in FIG. 3A. The Z axis of motion is parallel to the principal spindle of the machine. In FIG. 3B there is shown a milling cutter adopted to mill in the x–y plane.

Referring now to FIG. 4 in a typical contouring numerical control system for a machine tool, information is contained on a perforated tape, the arrangements of holes being in accordance with the standard format adopted by the Electronics Industries Association. Typically in preparing the information for the tape, the part to be machined is analyzed and subdivided into linear and circular segments, each such segment being represented by one block of information on the tape. (In some more sophisticated systems, a curve to be machined may be more accurately fitted to a portion of a parabola, so that parabolic segmented information would also be included; however, for simplicity we shall confine our discussion to linear and circular segments.) The tape also contains information concerning positive and negative directions in accordance with the standards of FIG. 3A, feedrates which depends inter alia on the metal being machined, whether the incremental or absolute displacement system is to be used, etc. The actual preparation of the tape may be by hand programming but frequently it is a fairly complicated process involving as it does the translation from problem oriented languages such as APT, SPLIT and AD-APT into machine language, the actual translation frequently being computer assisted, and eventually taking the form of a punched tape.

The tape 10 now contains intelligence concerning the straight and circular segments. The tape reader circuitry 12 transmits coded intelligence from the tape 10 to a buffer storage 14 which in the main contains some sort of memory with different units for each axis of motion being controlled. The buffer storage performs a temporary function and is used in some cases to prevent any momentary stoppage of the machine tool which could cause dwell marks on the work piece producing an inferior finish; more frequently however, the sero system is made "soft" thus obviating the need for buffer storage. The information is then electronically shifted to the interpolator section 16 which provides intermediate coordinate magnitudes for a straight line given the start and end coordinates, and for a curve (here a circle) from its given mathematical expression. The interpolator 16 performs its operations in synchronism with clocking signals indicated symbolically by clock 18.

Suppose for example that a straight line is to be machined, 0.004 inch along the +x axis and 0.008 inch along the +y axis. With 0.001 inch equal to one pulse, eight pulses would be commanded along the +y axis, and four pulses along the +x axis. The drive motors for the x and y axes respectively receive these commands so that a smooth continuous path is traced in the x–y plane.

The command signals from interpolator 16 are applied to the axis motion controller 20 which distributes the error signals to the machine drive for the axis which it controls. Functionally, the controller 20 compares the current position demand with the actual position to produce the position error signal. As long as there is a position error signal, the associated drive motors for the x and y axes will be actuated.

MATHEMATICAL CONSIDERATIONS

As indicated above, the contouring numerical control system can be programmed to follow a linear or circular path. The main programming parameters involved are shown in FIGS. 5A, 5B, 5C and 5D. The letters x and y (FIG. 5A) represent the Cartesian coordinates of the finishing point with respect to the starting point. The letters i and j (FIG. 5B) represent the coordinates of the starting point of the arc with respect to the arc center. (It is not necessary to define the sign of the coordinates i and j since only their magnitudes will be used; however, the sign must be given for the x and y coordinates.) Further, in a contouring numerical control system, it is necessary to identify the direction of rotation, clockwise or counterclockwise, in order to define the arc segments.

The parameters x, y, i, j and the direction of rotation CW or CCW define the path or contour which is to be followed. The rate at which the path is followed however, must be specified by a different parameter.

The following additional parameters are defined. Let:

Tlin = the time required to move with a uniform velocity from the starting point to the finishing point of a straight line segment.

Trad = the time required to move one radian with a uniform angular velocity.

The underlying principles governing the operation of the contouring numerical control system of the instant invention can be better understood by a consideration of the mathematics to follow. Let the movement along the coordinate axes be quantized into discrete increments $\Delta L$, a typical value of which may be 0.0001 inch.

Figure 5A:
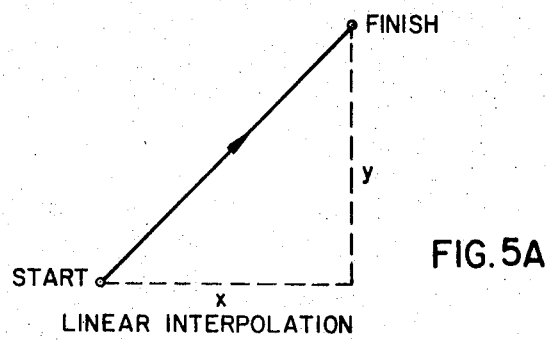
FIGS. 5A, 5B, 5C and 5D indicate the main contouring parameters for linear and circular interpolation.
Figure 5B:
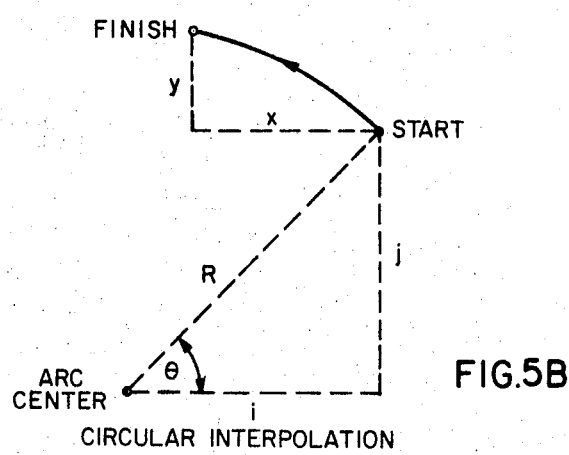
Figure 5C:
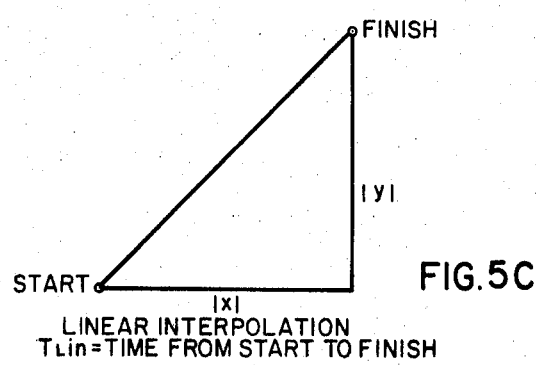

Referring now to FIG. 5C $$Vx = \Delta L/\Delta Tx1 = |X|/Tlin \quad (1)$$

Where
$Vx$ = the velocity in the x direction
$\Delta Tx1$ = the time to move an increment $\Delta L$ in the x direction
$|X|$ = the absolute magnitude of the x departure
Tlin = the time required to complete the distance $|X|$ From (1):

$$\Delta Tx1 = \text{Tlin } \Delta L/|X| \quad (2)$$

Similarly, $$\Delta Ty1 = \text{Tlin } \Delta L/|Y| \quad (3)$$

$\Delta Tx1$ and $\Delta Ty1$ therefore represent the calculated time between successive steps along the x-axis and the y-axis respectively. Tlin is the time required to complete one block of information programmed on the tape 10. $|X|$ and $|Y|$ displacements are also programmed on the tape 10.

Figure 5D:
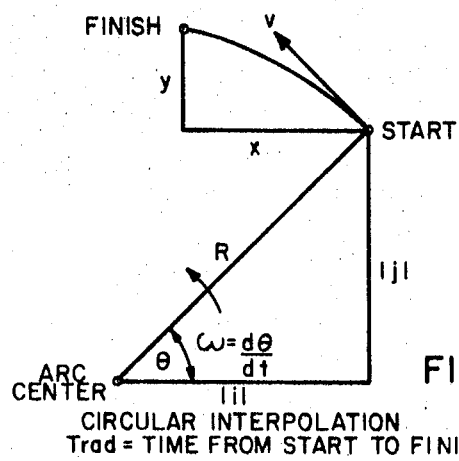

Referring now to FIG. 5D for the corresponding relationships for circular contouring:

$$i = R \cos \theta \quad (4)$$

$$j = R \sin \theta \quad (5)$$

Where $i, j$ are the instantaneous Cartesian coordinates along the arc path with respect to the center.
$\theta$ = the angle identified in FIG. 5D
$r$ = the radius of the arc (circle)

Differentiating equation 4:

$$di/dt = -R \sin \theta \ (d\theta/dt) \quad (6)$$

Differentiating equation 5:

$$dj/dt = r \cos \theta \ (d\theta/dt) \quad (7)$$

By definition:

$$\omega = d\theta/dt \quad (8)$$

where
$\omega$ = angular velocity
$\theta$ = angular displacement

Substituting the relationship of equations 5, 4 and 8 in equations 6 and 7 respectively.

$$di/dt = -j\omega \quad (9)$$

$$dj/dt = i\omega \quad (10)$$

$$V = R\omega \quad (11)$$

Where
V = circumferential (tangential velocity)
R = radius of the circle
$\omega$ = angular velocity in radians per unit time (12) The time Trad to move one radian with the desired velocity V is:

$$\text{Trad} = 1/\omega = R/V$$

From the velocity of equation (9), and since by definition velocity is distance divided by time, the circular time period $\Delta Ti$ between successive steps of size $\Delta L$ along the $i$ axis is $$\text{distance/time} = \Delta L/\Delta Ti = -j\omega \quad (13)$$

and the circular time period $\Delta tj$ between successive steps of size $\Delta L$ along the $j$ axis is:

$$\Delta L/\Delta Tj = i\omega \quad (14)$$

Solving for $\Delta Ti$ and $\Delta Tj$ and substituting Trad for $1/\omega$ $$\Delta'Ti = \text{Trad } \Delta L/|j| \quad (15)$$

$$\Delta'Tj = \text{Trad } \Delta L/|i| \quad (16)$$

It should be noted that $\Delta Tx1$ and $\Delta Ty1$, equations (2) and (3), are constant during the linear displacement. However, in circular contouring $\Delta Ti$ and $\Delta Tj$, equations (15) and (16) are not constant because $i$ and $j$ are continuously changing as the arc is traced out by the cutting tool. Therefore $\Delta Ti$ and $\Delta Tj$ must be computed continuously during circular contouring, each time using the latest coordinates for $i, j$ as curve is traced.

NUMERICAL CONTROL SYSTEM - FIGURE E2 EMBODIMENT

The numerical control system embodied in FIG. 2 will be described first because it will make for easier comprehension the operation of the FIG. 1 embodiment.

The X—($i$ or $j$) and Y—($i$ or $j$) interpolators are indicated generally at 22 and 24 respectively. The numerator register is shared in common and is identified at 26. A clock 28 insures the correct timing sequence for the interpolators 22 and 24. The mode and quadrant selector logic circuitry 30 receives the outputs of the interpolators 22 and 24, and logically sends the appropriate output to X($i$) position demand controller 32 and/or Y($j$) position demand controller 34. The inputs to selector logic circuitry 30 are $\pm x \pm y$, CW and CCW information which it receives from the reader circuitry 12.

The interpolator 22 comprises a denominator register identified at 36, a divider identified at 38, a subtractor 40, and a down counter identified at 42. A zero detector which is identified at 44 and a gate identified at 46, is arranged in cooperative array with the divider 38, down counter 42, and zero detector 44.

The interpolator 24 is similar to the interpolator 22 except that it has an adder 52 instead of a subtractor. The complementary units are identified as follows:

| denominator register | 48 |
| divider | 50 |
| adder | 52 |
| down counter | 54 |
| zero detector | 56 |
| gate | 58 |

As stated earlier, the numerator register 26 is shared in common and forms a part of both interpolators 22 and 24.

The position demand controller 32 comprises an end position counter 31, a comparator 35 and a position demand counter 53. The end position counter 31 receives displacement information from the tape reader circuitry 12. The logic circuitry sends its position demand to counter 53. The output of the position demand counter 53 is applied to a subtractor 57 which is part of the axis motion controller indicated generally at 60; the controller 60 also includes a counter 55 having an input which is received from and X($i$) incremental transducer 62.

Similarly, the position demand controller 34 comprises an end position counter 33, a comparator 37 and a position demand counter 59. The Y($j$) axis motion controller indicated generally at 64 comprises subtractor 63, and counter 61; the input to counter 61 is from Y($j$) incremental transducer 66.

OPERATION OF FIG. 2 EMBODIMENT

The linear mode of operation will be considered first since it is the easiest mode to understand. The objective is to continuously calculate $\Delta tx1$ and $\Delta Ty1$ described in equations (2) and (3) respectively. Suppose for example that the feed velocity in the $x$ direction is 1 inch/min and the feed velocity in the $y$ direction is 0.1 inch/min. If the step $\Delta L = 0.0001$ then $\Delta Tx1$ is 0.0001 min and $\Delta Ty1$ is 0.001 min, that is the time between pulses in the $x$ direction is 0.0001 min and in the $y$ direction, 0.001 min. This means that the drive mechanism for the $x$ axis moves 10 steps before the drive mechanism for the $y$ axis moves one.

The dividers 38 and 50 calculate $\Delta Tx1$ and $\Delta Ty1$ respectively in digital form. The magnitudes of $|X|$ and $|Y|$ are taken from the tape 10 in digital form and placed in registers 36 and 48 respectively. The numerator register 26 contains the time Tlin to complete one block of information on the tape 10. The down counters 42 and 54 are initially loaded with $\Delta Tx1$ and $\Delta Ty1$ in digital form. Each pulse from clock 28 causes the down counters 42 and 54 to decrease by one. After $\Delta Tx1$ has elapsed, down counter 42 reaches zero, which condition is detected by zero detector 44 which then enables gate 46 causing the down counter 42 to be reloaded with $\Delta Tx1$. The signal indicating zero detection is passed to the mode and quadrant selector logic which changes the contents of the $x$ position demand counter 53 by +1 if $x$ is positive, and −1 is $x$ is negative. Similarly, when down counter 54 reaches zero, the $y$ position demand counter 59 is changed +1 or −1 depending the sign of y.

The X incremental position transducer 62 sends pulses to the axis motion controller 60, each pulse representing the actual displacement $\Delta L$ along the $X$ (or $i$) axis. The pulses from the $X(i)$ incremental position transducer 62 are applied to counter 55 which are then applied to subtractor 57. Pulse from $X(i)$ position demand counter 53 are applied to subtractor 57. The two input counts are effectively subtracted in subtractor 57 to give a difference which is a function of the $x$ ($i$) axis position error. The comparator 35 compares counters 31 and 53 and when they are equated sends an exhibit signal to counter 53. The servo motors (not shown) for the $x$ axis will continue to actuate the mechanism vectorially in the $x$ direction until the $x$ axis position error is zero.

The $Y$ ($j$) incremental position transducer 66 sends pulses to the $Y$ ($j$) axis motion controller 64, i.e., counter 61, each pulse representing a displacement $\Delta L$ along the $Y$ ($j$) axis. Similarly, the subtractor 63 performs the indicated subtraction of counts to provide the $Y$ ($j$) axis position error.

The mode and quadrant selector logic circuitry 30 receives the information $+x$ or $-x$, $+y$ or $-y$ and the CCW and CW information from the tape 10 and by enabling and disabling logic circuit elements drives the counter 53 up or down, and similarly, drives the counter 59 up or down. The conditions are depicted in FIG. 6.

The circular contouring mode is more difficult since the logic circuitry must take into account in which quadrant the cut is to be made; this it does by a recognition of $\pm x \pm y$ and the CW, CCW information.

During circular contouring it should be noted that the denominator registers 36 and 48 contain the $|i|$ $|j|$ information and not $x$, $y$ information as in the case of linear contouring. The sign of $x$ and $y$ is considered by the mode quadrant selector logic circuitry 30. Further, during circular contouring denominator register 36 is decreased by one (by subtractor 40) each time down counter 54 reaches zero, while denominator register 48 is increased by one (by reason of adder 52) each time down counter 42 reaches zero. The denominator register 36 therefore decreases by one and the denominator register 48 increases by one (this may not occur simultaneously). The addition and subtraction is made necessary by the fact that as one moves about the quadrant one coordinate of the pair $i, j$ is decreasing an incremental amount, while the other is increasing incrementally. (It will be recalled that as one proceeds along the arc of the circle that the instantaneous values of $i$ and $j$ are utilized.)

A study of the four CCW rotation causes in FIG. 7 will make clear the reasons for the addition and subtraction. When $x$ is + and $y$ is +, (fourth quadrant) the $j$ coordinate is decreasing incrementally, and therefore it is put in denominator register 36.

The down counters 42 and 54 are reloaded with the appropriate $\Delta Ti$ and $\Delta Tj$ respectively which are recalculated each time using the updated denominator values. The numerator does not change during the interpolation process, but remains at the original magnitude, Trad, the time required to move one radian with the desired uniform angular velocity.

NUMERICAL CONTROL SYSTEM - FIG. 1 EMBODIMENT

The system described in connection with FIG. 2 utilizers dividers and counters. In the FIG. 1 embodiment, the arrangement combines the divider and down counter functions providing concomitant savings in circuit complexity as well as in operational complexity.

Figure 2:
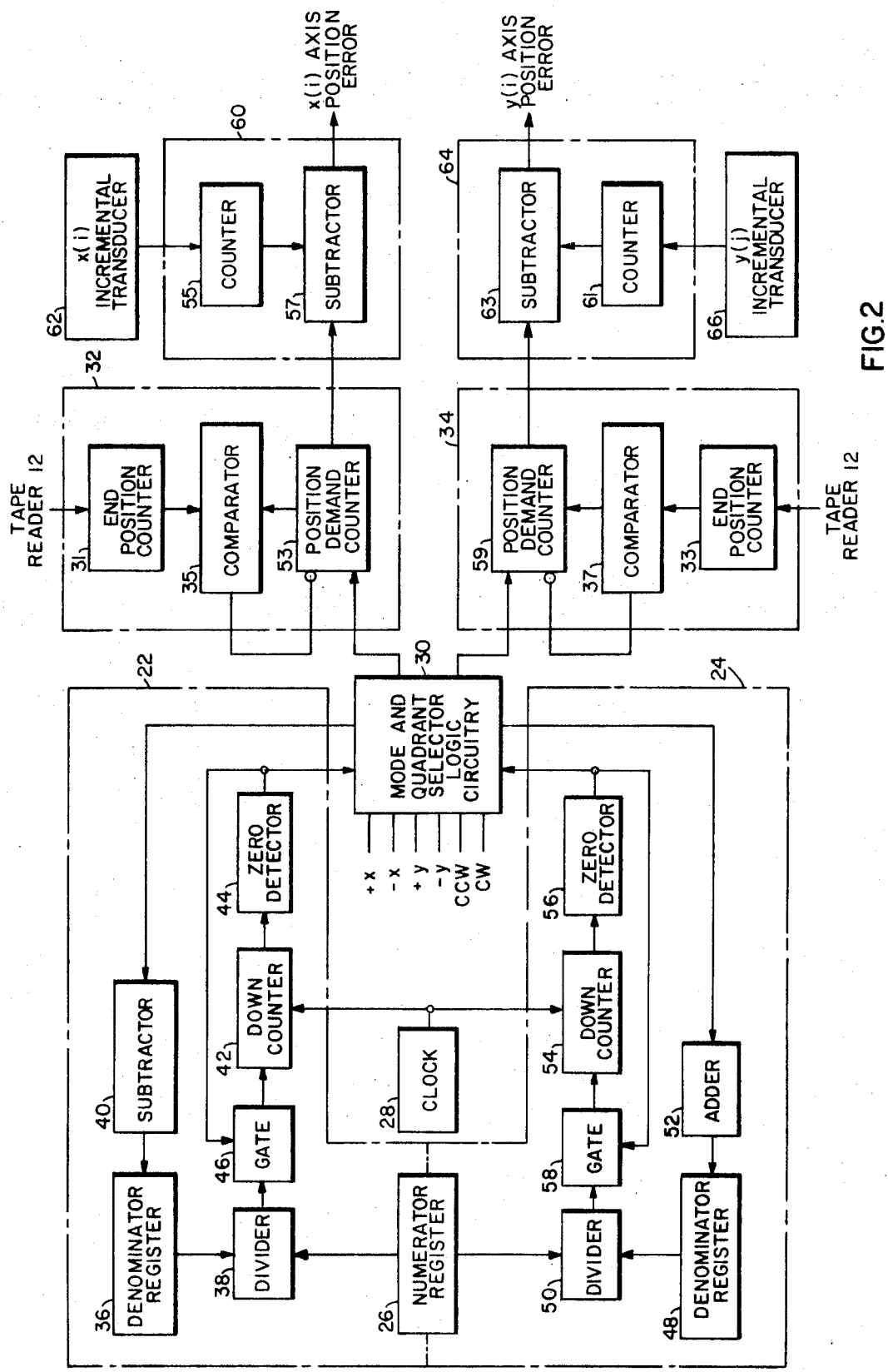
FIG. 2 is a block diagram of another exemplary embodiment of the numerical contouring control system in accordance with the invention.

The interpolator of FIG. 1 (one for each axis to be controlled) combines divider and down counter functions. Three shift registers: numerator, denominator and remainder are identified at 68, 70 and 72. Three 1-bit shift registers 74, 76, 78 are used as carry storage means in cooperation with three full adders 80, 82 and 84, and a fourth 1-bit shift register 86 is utilized for capturing and storing the sign bit of the number in the remainder shift register 72. The shift registers and full adders are interconnected with logic circuitry to provide the requisite logic signal flowthrough. AND circuits are identified at 88, 90, 92, 94, 96 and 98. Inverters are identified at 100, 102 and 104. The logic OR functions are performed by the means identified at 106, 108 and 110. Completing the description of FIG. 1, a position demand controller 112 (similar to position demand controllers 32 and 34) receives the output of the 1-bit shift register 86, and its output is applied to axis motion controller 114. The mode and quadrant logic circuitry is identified at 118. The axis motion controller 114 is similar to its counterparts 60 and 64 in FIG. 2.

The controller 114 also receives axis incremental position data from transducer 116 and the output from the controller 114 is the instantaneous axis position error.

OPERATION OF THE FIG. 1 EMBODIMENT

The operation of the interpolator of FIG. 1 will be appreciated best by the consideration of a simple example. Assume that linear interpolation is to be accomplished to move the cutting tool from $X_0$ to $X_1$ (for convenience assume here $X_0 = 2$). The Tlin has been calculated and the absolute magnitude of the departure $|X_1|$ is known. The problem is to calculate $\Delta Tx1$. In order to simplify the problem further we shall treat with decimals rather than numbers in binary form, with the understanding that in the actual situation the interpolator is at all times dealing with numbers in binary form. Assume that the numerator Tlin is equated to 111 and the denominator $|X_1|$ is equated to 33.

Referring now to FIG. 1 and in particular to FIGS. 8 and 9, since division is repeated subtraction, the interpolator performs successive subtraction. Starting at $X_0$, the cycle count is 0 and the remainder $R_0$ in the remainder register 72 is 0 and the sign bit recognized by the 1-bit shift register 86 is 0. The position demand counter 112 is at $X_0$.

The clock begins to count $R_1 = R_0 - D + N = 0 - 33 + 111 = 78$ (17)

$$R_2 = R_1 - D = 78 - 33 = 45 \qquad (18)$$

$$R_3 = R_2 - D = 45 - 33 = 12 \qquad (19)$$

$$R_4 = R_3 - D = 12 - 33 = -21 \qquad (20)$$

The sign bit 86 captures the change in sign as a carry which it sends to the position demand controller 112 which increases the count to $X_o + 1$. The incremental position transducer 116 indicates $X_o$, and thus the controller 114 develops an error signal indicating to the servo system to move $\Delta L$ along the $X$- axis. As may be seen from a study of FIG. 9, after four counts the mechanism has advanced one increment or $\Delta L$. The procedure continues and every time there is a change in sign in the remainder register 72, the sign bit sends a signal to the position demand controller 112. Note: each time there is a change in sign, the numerator N is added to the remainder. As may be seen in FIGS. 8 and 9 the change in sign occurs at counts 4, 7, 11, 14, 17 and 21, the mechanism being advanced 6 $x$ $\Delta L = 0.0006$ inch.

A more detailed consideration will now be given concerning the interpolator shown in FIG. 1. At the beginning and at the end of a block of information appearing on the tape 10, the line marked FIRST ITERATION is made HIGH or a ONE. This signal is derived from the reader 12. This signal is inverted by inverter 104, and AND gate 98 is disabled; this prevents a recirculation of the contents of the remainder shift register 72 and effectively insures that it will contain all zeroes. The presence of the ONE on the FIRST ITERATION line, produces an output at the OR gate 110, enabling AND gate 96 — the contents of the numerator shift register 68 can now pass to the full adder 82. It should also be noted at this point that when the output of the shift register 86 is a ONE, OR gate 110 delivers an output to enable AND gate 96 and the contents of numerator shift register 68 can now pass to the full adder 82. It should also be noted at this point that when the output of the shift register 86 is a ONE, OR gate 110 delivers an output to enable AND gate 96 and the contents of numerator shift register 68 pass to full adder 82.

The numerator and denominator information on the tape 10 is read by reader circuitry 12 which sends an enabling signal (binary ONE) to the lines marked LOAD NUMERATOR and LOAD DENOMINATOR, which signal is then inverted by inverters 100 and 102 thereby disabling AND gates 92 and 94 respectively. The disablement of AND gates 92, 94 prevents the contents of numerator and denominator registers 68 and 70 from being recirculated. The data from reader 12 is then applied in binary form to AND gates 88 and 90 respectively. In the case of the numerator, OR gate 108 simply passes binary data into the numerator shift register 68.

The denominator presents a somewhat different situation. Since the interpolator is dividing, and since division is successive subtraction, the denominator is put into the denominator shift register 70 in negative form or as the 2's complement of the binary number. In the binary systems this is quite simple: every 1 is changed to an 0 and every 0 is changed to a 1. A 1 is then added to the least significant bit of the number formed. For example two in binary form is 0010. Changing this to its 2's complement:

```
0010        2 in binary form
1101
   1
1110
```

The 2's complement of 2 is therefore 1110. The number must also contain a sign bit. Therefore to the 4 bit word 1110, we add an additional 1 making it 11110, the 1 (sign bit) indicating that the number is negative. If the number is positive the sign bit is a 0. In the practical embodiment 20 bits are used so the 20th bit is a sign bit.

When the enabling signal at LOAD NUMERATOR and LOAD DENOMINATOR is removed and no signals are present at the inputs marked DATA, then the numerator and denominator information in binary form is in registers 68 and 70 respectively. AND gates 92 and 94 are enabled, and the information in the registers is recirculated. In the case of the numerator, since it never changes the same number is continuously recirculated. As concerns the denominator however, two modes must be differentiated. In the linear mode as described in connection with FIGS. 8 and 9, the denominator does not change so the information is simply shifted through the full adder 80 unchanged. In the circular contouring mode, the denominator for one axis is decreased and the denominator for the other axis is increased. Accordingly, when the sign bit changes, an increment or decrement is applied to the OR gate from logic circuitry. In one case a pulse train with all ZEROS except in the least significant bit position is applied. In the other case a pulse train with ONES in all bit positions is applied. For example:

$$+1 \quad 00000001$$
$$-1 \quad 11111111$$

For convenience, the truth table for a full adder is shown in FIG. 10 and the decimal numbers are shown in binary and 2's complement form in FIG. 11. The operation of the two full adders 82 and 84 will now be considered. Two full adders are needed because we are required to handle three pieces of information: numerator, denominator and remainder. In order to understand the cooperation of the registers 68, 70 and 72 with the associated logic circuitry assume that the numerator shift register contains +5 and the denominator shift register a +3 (the remainder register is 0). In binary form:

| Sign Bit | Binary | Decimal |
|---|---|---|
| 0 | 101 | +5 |
| 1 | 101 | −3 |

The bits are handled from right to left i.e., the least significant bit first. At the beginning of the first iteration, a ONE on the line FIRST ITERATION enables OR gate 110 which outputs a ONE to AND gate 96. The numerator shift register 68 then passes its contents to the full adder 82 at the A input. The A input thus receives successively 1, 0, 1, 0. The B input receives the bits 1, 0, 1, 1. The operation of the full adders 82 and 84 are shown in FIGS. 12 and 13 respectively. These operations may be checked by reference to FIG. 10 which contains a truth table for a full adder. The presence of the ONE on the line FIRST ITERATION is inverted to a ZERO by inverter 104 disabling AND gate 98. There is thus no carry back of the contents of the shift register 72 and all the inputs to the input of full adder 84 are ZEROS The B input of full adder 84 is of course the sum S output of full adder 82. The C input is the carry of adder 82. The C input is the carry of the full adder 84 itself. The results of the successive inputs to adder 84 are shown in FIG. 13. The S outputs of adder 84 are passed to the remainder shift register 72. As will be seen in FIG. 13 the binary number in shift register 72 is now 0010 which is +2. This is exactly what is expected +5−3 = +2.

The signal is now removed from the line FIRST ITERATION disabling OR gate 110 and hence AND gate 96. The contents of the numerator shift register 68 cannot pass to full adder 82 and hence the A inputs are all ZEROS. The B inputs will be successively 1011 as the contents of the denominator shift register 70 are gated to the full adder 82. The results are shown in FIG. 14. The removal of the signal from the line FIRST ITERATION enables gate 98 so that the bits in the remainder shift register 72 are passed to the full adder 84 at the A input i.e., 0010 (it will be recalled that +2 is in the register 72). The B input is the output S of the full adder 82. The output S of the full adder 84 are shown in FIG. 15. Thus as can be verified in FIG. 11 1111 is −1. The sign bit 1 is recognized and captured by 1-bit shift register 86, which sends a ONE to the positions demand controller 112. The presence of the ONE sign enables OR gate 110, which passes a ONE to enable AND gate 96. The enabling of AND gate 96 permits the bits in the numerator shift register 68 to be shifted into full adder 82. The numerator will now be added to the remainder as explained in connection with FIG. 8.

What is claimed is:

1. Numerical control contouring system for a machine tool, said system providing position command signals which are a function of incremental displacements ΔL along rectangular coordinate directions, said system being actuated in response to at least one block of intelligence indicia on a control media comprising:
    a. means responsive to said control media for providing an arithmetical numerator in digital form which is a function of the time required to execute the commands derived from the intelligence contained in said block;
    b. means responsive to said control media for providing an arithmetical denominator in digital form which is a function of the required displacements in said rectangular coordinate directions, respectively, in accordance with said block of intelligence;
    c. means connected with said arithmetical denominator means adapted to digitally increment and decrement said denominator means respectively when said block of information depicts circular interpolation, and adapted to be digitally passive when said block of intelligence depicts linear interpolation;
    d. means, coupled to said arithmetical numerator and denominator means, for successively digitally subtracting said denominator means from said numerator means;
    e. means cooperating with said subtracting means for detecting a change in sign in the remainder as successive subtractions proceed, and for permitting the addition of the digital information in said numerator means to said remainder at the advent of the next subtraction; and
    f. means responsive to said detecting and permitting means for delivering said position command signals at the occurrence of said change in sign.

2. Numerical control contouring system according to claim 1 in which:
    a. said means for providing an arithmetical numerator comprises shift register means and gating means, said gating means being coupled to the input of said shift register means and being logically adapted at the first iteration to permit passage of the digital numerical intelligence to said shift register, and then to block further input until the beginning of the next block of intelligence on said control media.

3. Numerical control contouring system according to claim 1 in which:
    d. said means coupled to said arithmetic numerator for successive digital subtraction comprise remainder shift register means, full adder means, gating means, said full adder means being coupled to said arithmetic numerator and denominator means to perform algebraic addition, said gating means being coupled between the last stage of said remainder shift means and said full adder means to provide recirculation of the contents of said remainder shift register.

4. Numerical control contouring system according to claim 1 in which:
    e. said means for detecting and permitting comprise 1 bit shift register means and cooperating gating means, said 1 bit shift register means being coupled to the subtracting means for detecting a change of sign and for enabling said cooperating gating means to permit the digital intelligence in said arithmetical numerator means to pass to said subtracting means at the advent of the next subtraction.

5. Numerical control contouring system according to claim 1 in which:
    f. said responsive means comprising position demand counter means, end position counter means, and comparator means, said position demand means receiving count signals from said detecting means at a change in sign, said end position counter means receiving count signals as a function of the end position displacement intelligence from said control media, said comparator means being adapted to compare the counts in said demand counter means and said end position counter means and for inhibiting further counting of said position demand counter means when said compared counts are equal, the successive counts in said position demand counter means defining said position command signals.

6. Numerical control contouring system according to claim 1 including:
    g. transducer means for providing incremental positional signals as a function of the actual incremental displacements along said rectangular coordinate directions; and
    h. means for comparing said incremental positional signals with said position command signals to derive position error signals.

* * * * *